US011053025B2

(12) United States Patent
Merrit et al.

(10) Patent No.: US 11,053,025 B2
(45) Date of Patent: Jul. 6, 2021

(54) METHOD AND SYSTEM FOR LOAD ALLEVIATION

(71) Applicant: The Boeing Company, Chicago, IL (US)

(72) Inventors: Benjamin Samuel Merrit, Lynnwood, WA (US); Patrick B. Stone, Monroe, WA (US); Don J. Russell, Arlington, WA (US); Brennan John Dunlap, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 16/011,032

(22) Filed: Jun. 18, 2018

(65) Prior Publication Data

US 2019/0322390 A1     Oct. 24, 2019

Related U.S. Application Data

(60) Provisional application No. 62/660,236, filed on Apr. 19, 2018.

(51) Int. Cl.
| | |
|---|---|
| *B64F 5/50* | (2017.01) |
| *B66F 5/04* | (2006.01) |
| *G05D 27/02* | (2006.01) |
| *G05D 1/02* | (2020.01) |

(52) U.S. Cl.
CPC ............... *B64F 5/50* (2017.01); *B66F 5/04* (2013.01); *G05D 1/0212* (2013.01); *G05D 27/02* (2013.01); *G05D 2201/0216* (2013.01)

(58) Field of Classification Search
CPC .... B66F 5/04; B66F 3/24; B66F 3/247; B66F 3/25; B66F 3/32; B66F 5/00; G05D 1/0212; G05D 27/02; G05D 2201/0216; B62B 3/0618
USPC ........................................................ 254/2 B
See application file for complete search history.

(56) References Cited

U.S. PATENT DOCUMENTS

| | | | |
|---|---|---|---|
| 8,005,563 B2 | 8/2011 | Cobb et al. | |
| 8,620,470 B2 | 12/2013 | Cobb et al. | |
| 8,733,707 B2 | 5/2014 | Stone | |
| 2015/0125252 A1* | 5/2015 | Berzen Ratzel | B62D 11/20 414/800 |
| 2015/0239580 A1* | 8/2015 | Valenzuela | B66F 9/063 701/50 |
| 2018/0077849 A1* | 3/2018 | Fanshier | A01C 7/205 |

* cited by examiner

*Primary Examiner* — Lee D Wilson
*Assistant Examiner* — Thomas Raymond Rodgers
(74) *Attorney, Agent, or Firm* — Yee & Associates, P.C.

(57) ABSTRACT

A method and system for alleviating a load is provided. A support system is positioned at a nominal location with respect to an object. The support system comprises jacks and supports. Each of the supports is associated with one of the jacks. The object is positioned on the support system. The support system with the object is moved across a path. The height of each of the jacks is adjusted as the support system moves along the path to maintain a desired minimum load on each jack. Maintaining the desired minimum load prevents damage to the object.

20 Claims, 8 Drawing Sheets

METHOD AND SYSTEM FOR LOAD ALLEVIATION

RELATED PROVISIONAL APPLICATION

This application claims the benefit of U.S. Provisional Patent Application Ser. No. 62/660,236, filed Apr. 19, 2018, and entitled "Method and System for Load Alleviation."

BACKGROUND INFORMATION

1. Field

The present disclosure relates generally to manufacturing processes for aircraft applications. More specifically, the present disclosure relates to a method and system for load alleviation that prevents damage to an aircraft structure and associated tooling as the aircraft structure moves about the manufacturing facility.

2. Background

Manufacturing of an aircraft requires many complex processes. Aircraft parts may be moved from one location to another as they are formed and assembled. Movement of large aircraft parts from one station to another may be difficult due to their size, shape, and complexity.

Manufacturers often use portable tools to transport and support an aircraft part as it moves about the manufacturing facility. For example, a wing may be moved from one station to another using support structures on rails. In other cases, the wing may be moved on a carriage, chassis, or using a group of moveable tooling supports positioned at various points under the part.

When tooling supports are used to move the aircraft part, the support points may be stiffer than desired. Even small vertical movements by the supports result in large load changes. As the supports move about the manufacturing facility, uneven flooring may result in unexpected vertical movement of the tooling support points. Sunken areas in the floor will decrease loads while raised areas will increase loads. These large load changes may result in damage to the tool, the aircraft part, or both. Further, these load changes may possibly affect the quality and integrity of the part.

Therefore, it would be desirable to have a method and apparatus that takes into account at least some of the issues discussed above, as well as other possible issues.

SUMMARY

An illustrative embodiment of the present disclosure provides a method for alleviating a load. A support system is positioned at a nominal location with respect to an object. The support system comprises jacks and supports. Each of the supports is associated with one of the jacks. The object is positioned on the support system. The support system with the object is moved across a path. The height of each of the jacks is adjusted as the support system moves along the path to maintain a desired load on each jack. Maintaining the desired load prevents damage to the object.

Another illustrative embodiment of the present disclosure provides a support system for an object. The support system comprises hydraulic jacks and supports. Each of the hydraulic jacks is configured to adjust its height to maintain a minimum load from the object. Each of the supports is associated with one of the hydraulic jacks and is configured to move the object along a path.

A further illustrative embodiment of the present disclosure provides a method for alleviating a load. An aircraft structure is positioned on a support system. The support system comprises a plurality of tools. Each tool has a hydraulic jack, a support associated with the hydraulic jack, and a movement system. The support system with the aircraft structure is moved across a path. A height of the plurality of tools is adjusted as the support system moves along the path to maintain a desired load on each tool. Maintaining the desired load prevents damage to the object.

The features and functions can be achieved independently in various embodiments of the present disclosure or may be combined in yet other embodiments, in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the manufacturing process for an aircraft includes moving large, fragile parts from one location to another location in the manufacturing environment. As the parts are moved over uneven flooring, changes in height of one or more support points under the part may increase or decrease vertical loads. In some cases, a point may be overloaded, risking damage to the part or supporting tooling.

The illustrative embodiments also recognize and take into account that some currently employed solutions are more complex or use more resources than desired. As an example, active load alleviation may be used to avoid overload at tooling support points. Active load alleviation may require vertical screws to adjust in response to feedback from load cells at the tooling support points. In such a system, a servo motor is instructed which direction, if any, to turn. Each tooling point is in communication with one another and the system may require more complex programming than desired. Another drawback to this type of system is the increased energy requirements of operation and thus, increased cost.

Other solutions employ rail systems that transport the part along rails from one tooling station to another. These rail systems are semi-permanent, rigid, and do not provide the necessary manufacturing system flexibility. Still other solutions utilize shock absorbing systems with suspension springs. When using shock absorbers, the load is proportional to the spring compression, thereby dampening the problem but not solving it.

Thus, the disclosed embodiments relate to method and system for vertical load alleviation as a part moves across an uneven manufacturing floor. A plurality of support structures with hydraulic jacks are positioned under the part. These hydraulic jacks have a pressure regulator. As the part moves along the floor, the hydraulic jacks adjust independently to maintain a minimum load on each jack. If the pressure is above that corresponding to the minimum load, the jack will bleed and retract. If the pressure is below the desired minimum, the jack will extend. If a jack is at full extension and uneven flooring causes the jack to lose connection with the part, the other supports will assume the load and adjust accordingly. This process ensures that no point is overloaded and assists in preventing damage to the part or the associated tooling.

Figure 1:
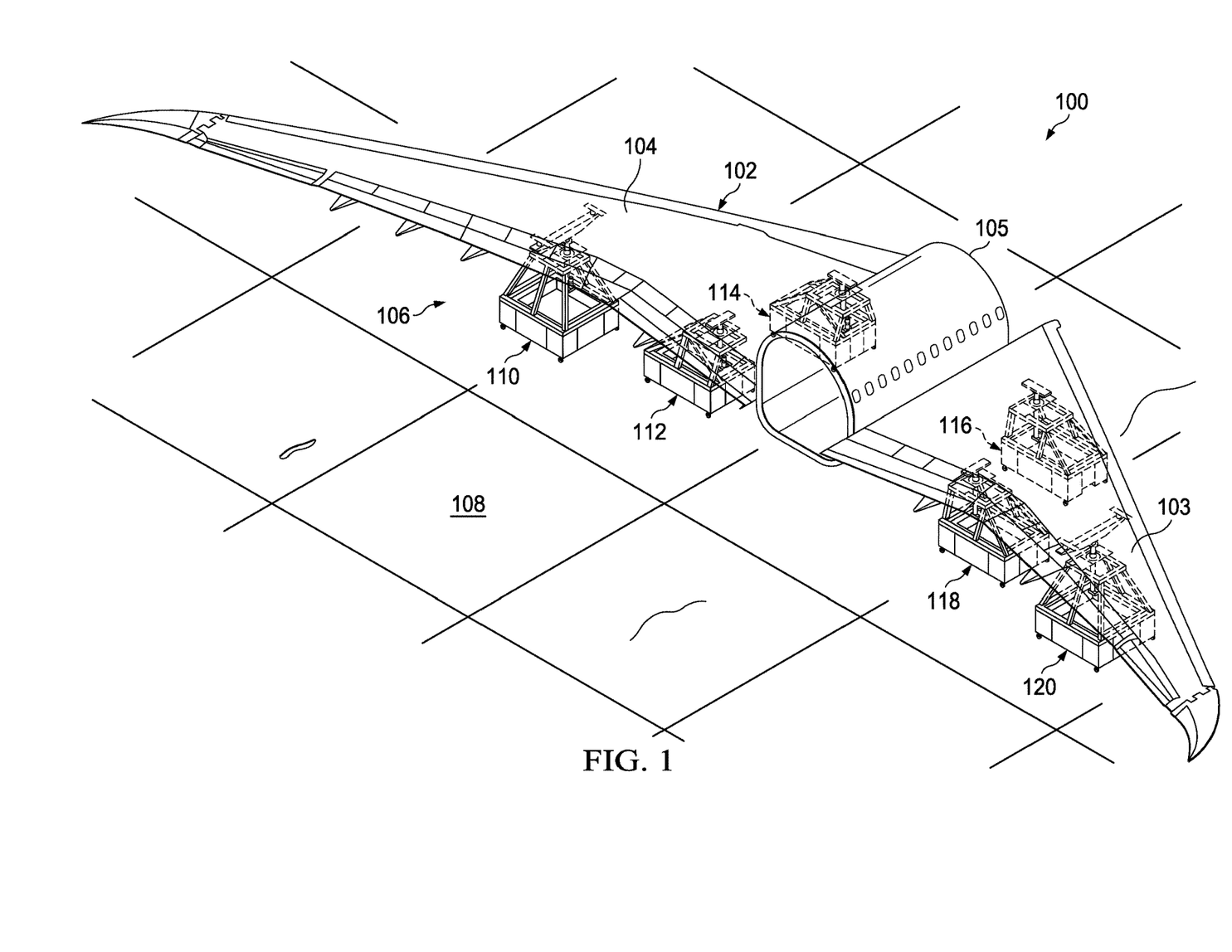
FIG. 1 is an illustration of a perspective view of a manufacturing environment in accordance with an illustrative embodiment.

With reference now to the figures and, in particular, with reference to FIG. 1, an illustration of a perspective view of a manufacturing environment is depicted in accordance with an illustrative embodiment. In this illustrative example, manufacturing environment 100 is a location where aircraft structure 102 is manufactured and installed in an aircraft.

As depicted, aircraft structure 102 is an assembly comprising wing 103, wing 104, and fuselage section 105. Aircraft structure 102 moves about manufacturing environment 100 using support system 106. Manufacturing environment 100 has floor 108. Floor 108 is uneven, having raised and sunken areas about the surface of floor 108.

Support system 106 includes a plurality of tools. In this illustrative example, support system 106 includes tool 110, tool 112, tool 114, tool 116, tool 118, and tool 120 in this illustrative example. Each tool is a support point for aircraft structure 102 as aircraft structure 102 moves. Support system 106 maintains aircraft structure 102 in a plane as aircraft structure 102 moves from one location to another location across floor 108. Tool 110 and the components within tool 110 are shown in greater detail in FIG. 4.

Figure 2:
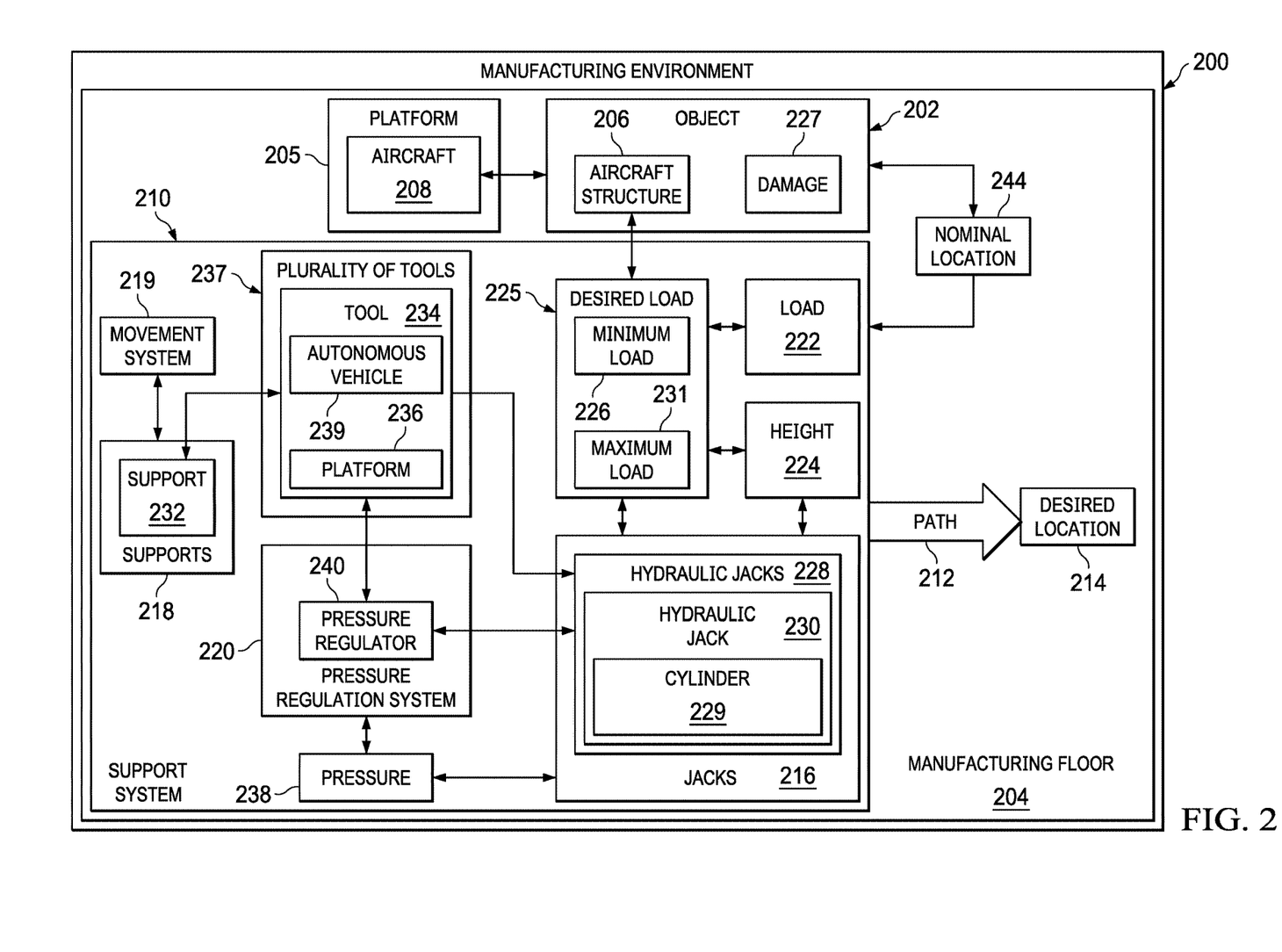
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. In this illustrative example, manufacturing environment 200 is an example of an environment where object 202 may be manufactured.

Manufacturing environment 200 may take a number of different forms. For example, without limitation, manufacturing environment 200 may take the form of a factory, a manufacturing facility, an outdoor factory area, an enclosed manufacturing area, an offshore platform, or some other type of manufacturing environment suitable for building at least a portion of object 202.

In this illustrative example, manufacturing environment 200 has manufacturing floor 204. Object 202 is moved about manufacturing floor 204 during production and assembly.

Object 202 may be configured for use in platform 205. Platform 205 may take a number of different forms. For example, without limitation, the platform may be mobile platform, a stationary platform, a land-based structure, an aquatic-based structure, or a space-based structure. More specifically, the platform, may be an aircraft, a surface ship, a tank, a personnel carrier, a train, a spacecraft, a space station, a satellite, a submarine, an automobile, a power plant, a bridge, a wind turbine, a dam, a house, a manufacturing facility, a building, and other suitable platforms.

Object 202 takes the form of aircraft structure 206 in this illustrative example. Aircraft structure 206 may be a component configured for use in aircraft 208. For example, without limitation, aircraft structure 206 may take the form of a wing, a skin panel, a fuselage section, a vertical stabilizer, a horizontal stabilizer, a compartment, a bulkhead, an assembly, a combination thereof, or some other structure.

As illustrated, support system 210 is configured to move object 202 about manufacturing floor 204. Components within support system 210 are positioned under object 202.

Support system 210 comprises jacks 216, supports 218, movement system 219, and pressure regulation system 220. Each of jacks 216 is an actuator configured to extend and retract underneath object 202. Each of jacks 216 is configured to extend or retract in response to load 222 placed on each jack by object 202. Specifically, each of jacks 216 adjusts its height 224 to maintain desired load 225 from object 202. Maintaining desired load 225 prevents damage 227 to object 202. Damage 227 may include, for example, without limitation, deformation, cracks, tears, divots, or other undesired effects from excess loads placed on object 202.

Jacks 216 take the form of hydraulic jacks 228 in this illustrative example. In other illustrative examples, one or more of jacks 216 may take other forms, depending on the particular implementation.

Hydraulic jack 230 in hydraulic jacks 228 may comprise a number of different components including, for example, without limitation, hydraulic cylinder 229, a hydraulic pump, a control valve, and other suitable components. The size, shape, and configuration of each of these components relative to one another may be selected such that hydraulic jack 230 operates in a desired manner. As an example, the control valve may be positioned between the cylinder and a pressure regulator.

As used herein, "a number of" when used with reference to items means one or more items. Thus, a number of components include one or more components.

Desired load 225 is set for each of jacks 216 prior to operation. Desired load 225 for each jack may be selected such that support system 210 does not overload at any of the other points in support system 210. In other words, when jacks 216 maintain desired load 225 for each jack, support system 210 does not overload and the risk of damage 227 to object 202 is substantially reduced or eliminated.

Desired load 225 may take the form of minimum load 226, maximum load 231, or some load in between. For instance, if desired load 225 takes the form of minimum load 226, hydraulic jack 230 works to maintain minimum load 226. As an example, if load 222 on hydraulic jack 230 from object 202 is less than minimum load 226, hydraulic cylinder 229 of hydraulic jack 230 extends until minimum load 226 is reached, thus compensating for higher loads on other parts of support system 210.

As another example, if load 222 from object 202 exceeds minimum load 226, hydraulic cylinder 229 of hydraulic jack 230 retracts until minimum load 226 is reached. In this manner, support system 210 is configured to balance load 222 from object 202 between jacks 216 to maintain minimum load 226 and prevent damage 227 to object 202.

In some cases, jacks 216 also may be configured to have maximum load 231. Maximum load 231 is predetermined and set for each of the jacks. For example, hydraulic jack 230 may be configured to have maximum load 231. If load 222 of hydraulic jack 230 exceeds maximum load 231, hydraulic cylinder 229 of hydraulic jack 230 is retracted until load 222 reaches maximum load 231. If load 222 of hydraulic jack 230 is less than maximum load 231, hydraulic cylinder 229 extends until maximum load 231 is met or until hydraulic cylinder 229 cannot extend any farther.

As illustrated, supports 218 may be associated with jacks 216. As used herein, when one component or structure is "associated" with another component or structure, the association is a physical association in the depicted examples.

For example, a first component, such as one of supports 218, may be considered to be associated with a second component, such as one of jacks 216, by being at least one of secured to the second component, bonded to the second component, mounted to the second component, attached to the component, coupled to the component, welded to the second component, fastened to the second component, adhered to the second component, glued to the second component, or connected to the second component in some other suitable manner. The first component also may be connected to the second component using one or more other components. For example, the first component may be connected to the second component using a third component. Further, the first component may be considered to be associated with the second component by being formed as part of the second component, an extension of the second component, or both. In another example, the first component may be considered part of the second component by being co-cured with the second component.

Supports 218 in support system 210 are configured to move object 202 along path 212 using movement system 219. For instance, aircraft structure 206 may be moved along path 212 to desired location 214 for additional processing and/or assembly in aircraft 208.

Movement system 219 may include at least one of wheels, conveyors, or other suitable components. As used herein, the phrase "at least one of," when used with a list of items, means that different combinations of one or more of the listed items may be used, and that only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item C. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

As depicted, supports 218 include support 232. Support 232 may be associated with hydraulic jack 230 to form a unit, tool 234, in this illustrative example. Tool 234 also may include platform 236. Tool 234 is positioned underneath object 202 to provide support for a portion of object 202. Platform 236 on tool 234 is a structure configured to receive a portion of object 202 and hold that portion of object 202 in place as object 202 moves. For example, platform 236 may take the form of a cradle. Tool 234 is one of plurality of tools 237 that make up support system 210.

Hydraulic jack 230 is positioned between support 232 and platform 236. Hydraulic jack 230 provides vertical movement for platform 236, thus adjusting the height of object 202 at that point. A number of other structures may be present between support 232 and hydraulic jack 230 in some illustrative examples.

In some instances, tool 234 may take the form of autonomous vehicle 239. Autonomous vehicle 239 is configured to move independently about manufacturing floor 204. In other illustrative examples, tool 234 may take the form of a structure with powered drive wheels controlled directly by an operator.

As depicted, pressure regulation system 220 comprises a group of pressure regulators 240. Pressure regulation system 220 is configured to regulate pressure 238 for each of jacks 216. Pressure regulation system 220 includes pressure regulator 240 in this illustrative example.

Pressure regulator 240 regulates pressure 238 for hydraulic jack 230. Pressure regulator 240 may be a digital pressure regulator that controls the amount of force the cylinder can produce. In response to the activity of pressure regulator 240, hydraulic cylinder 229 of hydraulic jack 230 extends or retracts. Pressure regulator 240 may be positioned between the control valve and the pump.

Pressure regulation is preset for each jack in support system 210. As a result, each jack in jacks 216 may operate independently of one another. While there is an indirect interaction between jacks due to aircraft structure stiffness, tool stiffness, and load sharing, each cylinder extends and retracts without needing to account for the behavior of other cylinders. Each hydraulic jack responds to its internal pressure by extending or retracting based on predetermined parameters. Thus, the effectiveness of support system 210 is not dependent on the number of jacks in the system. The system is scalable to include more or fewer jacks.

Changes in pressure 238 in hydraulic jack 230 correlate to changes in load 222 on hydraulic jack 230. For example, when pressure regulator 240 senses pressure 238 is too high, based on predetermined settings, hydraulic jack 230 bleeds and hydraulic cylinder 229 retracts until desired load 225 is reached (i.e., minimum load 226). When pressure regulator 240 senses pressure is too low, based on predetermined settings, hydraulic cylinder 229 extends such that desired load 225 is maintained. Each jack in jacks 216 behaves in a similar manner, in real time, alleviating loads to prevent damage 227 to object 202 as object 202 moves over manufacturing floor 204.

In some cases, hydraulic jack 230 may be fully extended when load 222 falls below desired load 225. In such a case, hydraulic jack 230 can no longer extend to compensate. Support system 210 is designed such that the surrounding jacks will start to assume the load until hydraulic jack 230 regains its vertical position. These surrounding jacks will overload and thus, retract until the balance of loads is once again established. The other jacks will bring down the height of object 202 such that hydraulic jack 230 can reengage.

In a similar fashion, due to physical constraints, hydraulic jack 230 may not be able to retract enough to reach desired load 225 when hydraulic jack 230 is overloaded. Support system 210 may compensate by adjusting locally at other points. Other jacks may fall below their desired load 225 and extend until desired load 225 is reached.

Prior to object 202 being loaded onto support system 210, support system 210 is positioned at nominal location 244 with respect to object 202. Nominal location 244 may include a location and/or orientation of each component within support system 210 relative to object 202. Nominal location 244 is selected such that object 202 may be loaded onto support system 210 in a desired manner, without overloading the system.

With an illustrative embodiment, manufacturing and installation of object 202 may take less time than with currently used systems. Support system 210 provides both a mechanism of movement for object 202 and a method of load alleviation to decrease the risk of damage 227 to object 202 during manufacturing. Rework or discarding of object 202 also may be reduced. Adjustment of each tooling point is localized. Support system 210 maintains a plane for object 202.

Moreover, the use of support system 210, when manufacturing object 202, reduces the energy needed to adjust the height of object 202 and alleviate loads in a desired manner. As object 202 moves, only the hydraulic cylinder 229 of each hydraulic jack 230 is moving vertically, thus power requirements of support system 210 with plurality of hydraulic jacks 228 is reduced over currently used systems. The adjustment occurs in a passive manner.

Programming complexity is reduced and materials savings (e.g., batteries, electrical components) is realized. No permanent fixtures, such as rails, are needed. As a result, the use of support system 210 saves manufacturing time, decreases cost, and provides a flexible manufacturing system for object 202.

Figure 3:
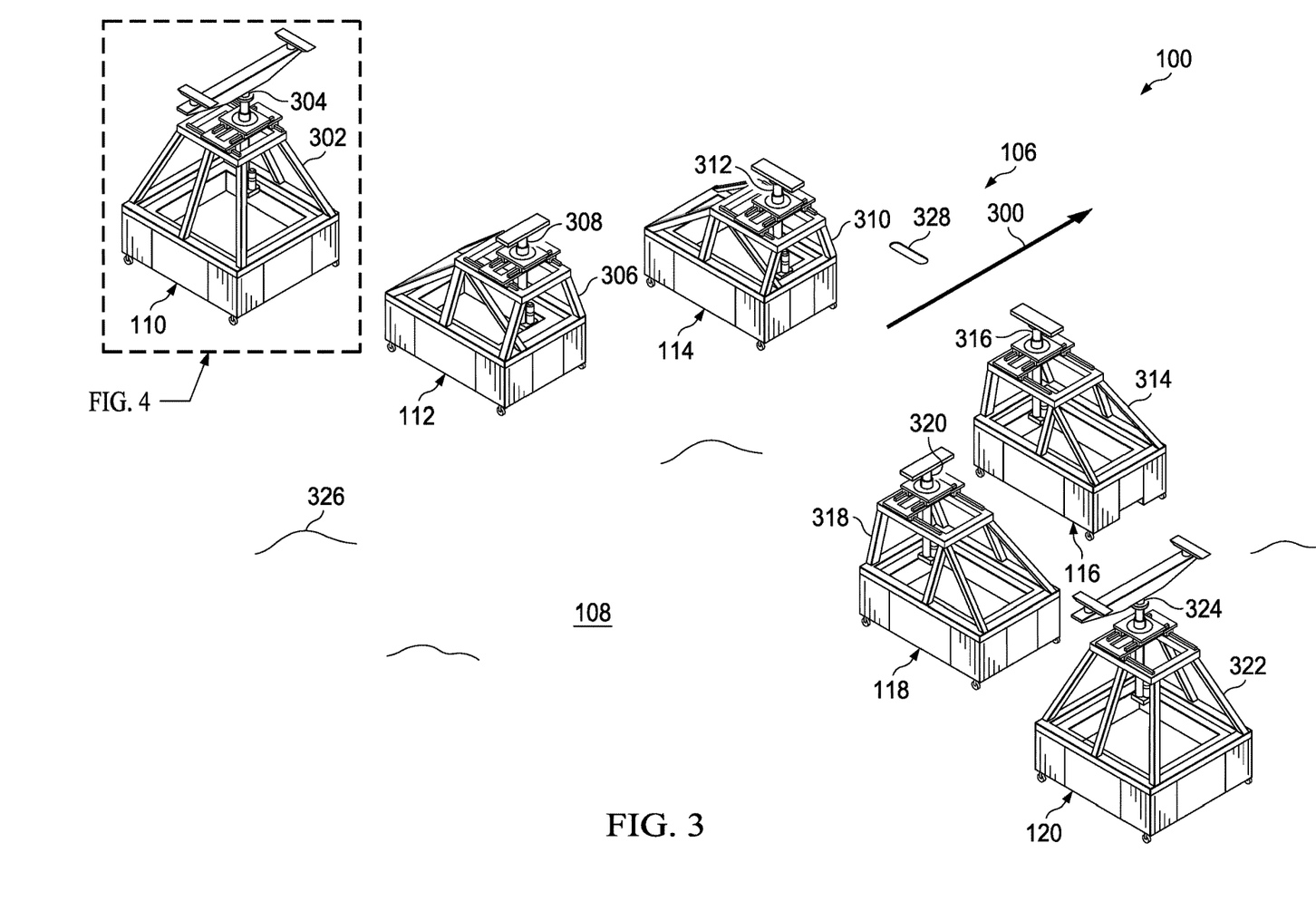
FIG. 3 is an illustration of a perspective view of a manufacturing environment in accordance with an illustrative embodiment.

With reference next to FIG. 3, an illustration of a perspective view of a manufacturing environment is depicted in accordance with an illustrative embodiment. Components within support system 106 from FIG. 1 are shown. Object 102 has been removed. Tool 110, tool 112, tool 114, tool 116, tool 118, and tool 120 are configured to move simultaneously in the direction of arrow 300 to transport aircraft structure 102. The tools may be autonomous or controlled by an operator. Each of the tools may be configured to turn, maneuver, or otherwise adjust their position relative to the others as needed.

As depicted, each tool comprises a support and a jack. Tool 110 has support 302 and hydraulic jack 304. Tool 112 has support 306 and hydraulic jack 308. Tool 114 has support 310 and hydraulic jack 312. Tool 116 has support 314 and hydraulic jack 316. Tool 118 has support 318 and hydraulic jack 320. Tool 120 has support 322 and hydraulic jack 324.

In operation, hydraulic jacks (304, 308, 312, 316, 320, 324) are each adjusted in response to changing loads from aircraft structure 102. For example, as tool 110 moves over feature 326 on floor 108, hydraulic jack 304 may extend or retract to alleviate the load on hydraulic jack 304 caused by feature 326. In this illustrative example, feature 326 is a raised area. As a result, as pressure within hydraulic jack 304 builds, indicating an increased load above minimum, hydraulic jack 304 may retract until the minimum load is reached.

In a similar fashion, tool 114 may move over feature 328 of floor 108. In this illustrative example, feature 328 is a sunken area. As a result, as pressure within hydraulic jack 312 lessens, indicating a load below a desired minimum load, hydraulic jack 312 may extend to compensate.

Although support system 106 is shown as a with six tools in this illustrative example, other configurations are possible. The assembly may have more or fewer tools, depending on the implementation.

Figure 4:
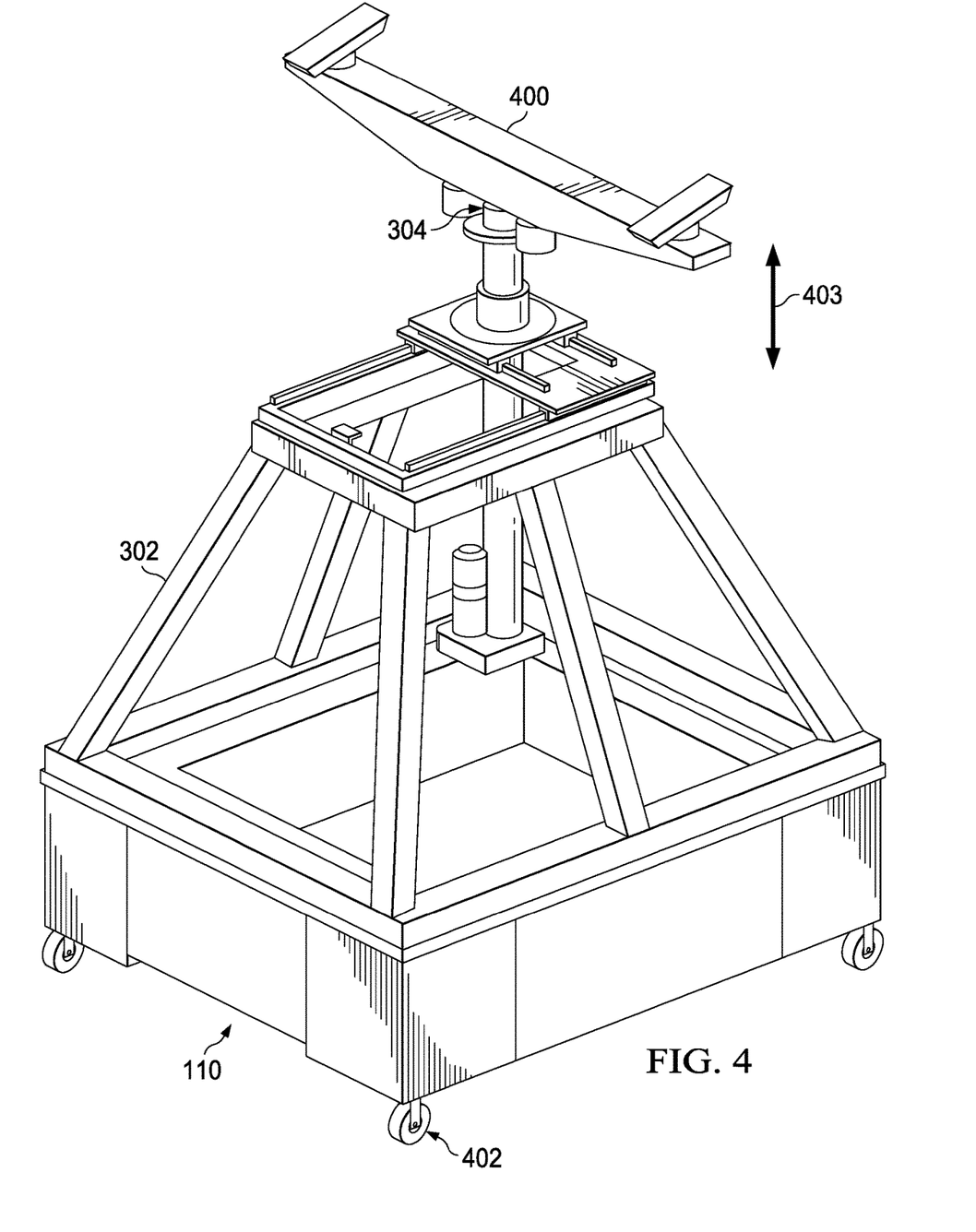
FIG. 4 is an illustration of a perspective view of a tool in accordance with an illustrative embodiment.

Turning now to FIG. 4, an illustration of a tool is depicted in accordance with an illustrative embodiment. A more-detailed view of tool 110 in FIG. 3 is shown. FIG. 4 depicts an example of a physical implementation for tool 234 in support system 210 shown in block form in FIG. 2.

As depicted, in addition to support 302 and hydraulic jack 304, tool 110 includes platform 400, wheels 402, and a pressure regulator (not shown in this view). Platform 400 receives a portion of aircraft structure 102 and holds it in place. Wheels 402 provide the mechanism of movement for tool 110. As tool 110 moves across floor 108, hydraulic jack 304 extends and retracts in the direction of arrow 403 to maintain a minimum load and to compensate for excess loads.

Other tools in support system 106 may have platforms of various shapes and sizes, depending on which portion of the aircraft the tool is configured to support. Pressure regulators, jacks, and supports in each tool may have the same or different configurations in an illustrative embodiment.

Aircraft structure 102 in FIG. 1 is only one physical implementation of an object that can be transported using support system 106. Although the examples for an illustrative embodiment in FIG. 1, FIG. 3, and FIG. 4 are described with respect to an aircraft, an illustrative embodiment may be applied to other types of platforms. Support system 210 in FIG. 2 may be used to move and alleviate loads for structures manufactured for use in any platform.

The different components shown in FIG. 1, FIG. 3, and FIG. 4 may be combined with components in FIG. 2, used with components in FIG. 2, or a combination of the two. Additionally, some of the components in FIG. 1, FIG. 3, and FIG. 4 may be illustrative examples of how components shown in block form in FIG. 2 may be implemented as physical structures.

Other configurations of support system 106 may be implemented other than those shown in FIG. 1, FIG. 3, and FIG. 4. For example, support system 106 may have redundant feedback systems to ensure a minimum load is maintained. Automatic halt conditions for movement of support system 106 may be integrated when the load at any one point reaches undesired levels.

Even though each tool in support system 106 is shown in FIG. 3 as having a single support and a single hydraulic jack, other configurations are possible. For instance, one or more tools in support system 106 may include a single support structure with multiple hydraulic jacks configured to balance localized loads for that tool. As an example, a tool can have two jacks, three jacks, five jacks, or some other suitable number of jacks.

Figure 5:
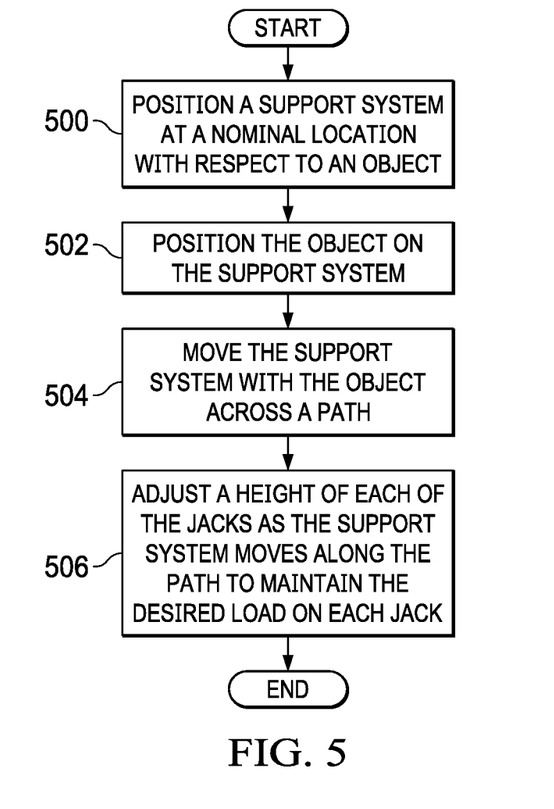
FIG. 5 is an illustration of a flowchart of a process for alleviating a load in accordance with an illustrative embodiment.

With reference next to FIG. 5, an illustration of a flowchart of a process for alleviating a load is depicted in accordance with an illustrative embodiment. The method depicted in FIG. 5 may be used to balance loads for object 202 shown in FIG. 2.

The process begins by positioning a support system at a nominal location with respect to an object (operation 500). The object is positioned on the support system (operation 502).

The support system with the object is moved across a path (operation 504). A height of each of the jacks is adjusted as the support system moves along the path to maintain a desired load on each jack (operation 506) with the process terminating thereafter. Specifically, the pressure in each jack is monitored in real time and the system reacts to changing pressure to maintain the desired load.

Figure 6:
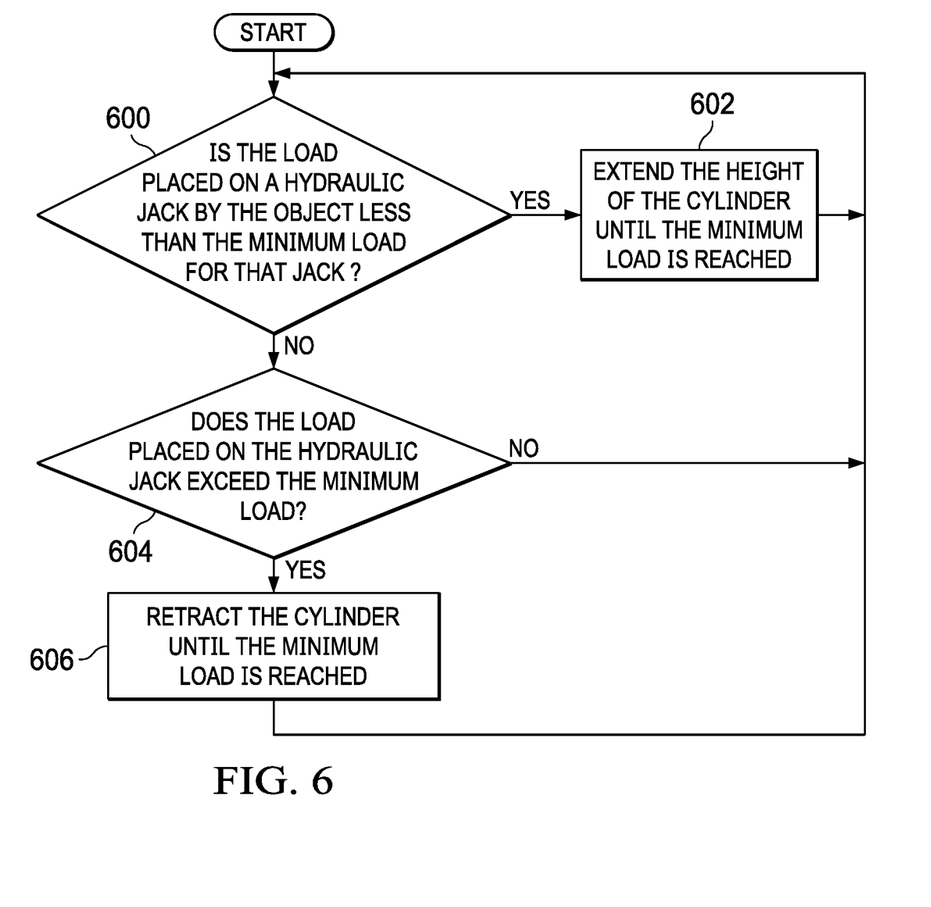
FIG. 6 is an illustration of a flowchart of a process for adjusting a height of a hydraulic jack in accordance with an illustrative embodiment.

Turning to FIG. 6, an illustration of a flowchart of a process for adjusting the height of hydraulic jacks is depicted in accordance with an illustrative embodiment. The method depicted in FIG. 6 further describes the process in operation 506 in FIG. 5 to maintain a minimum load on each hydraulic jack.

The process begins by determining whether the load placed on a hydraulic jack by the object is less than the minimum load for that jack (operation 600). If the load is less than the minimum load, the height of the cylinder is extended until the minimum load is reached (operation 602). The process returns to operation 600.

If the load is not less than the minimum load, the process determines whether the load placed on the jack exceeds the minimum load (operation 604). If it does not, the process returns to operation 600. If the load placed on the jack exceeds the minimum load, the process then retracts the cylinder until the minimum load is reached (operation 606) and returns to operation 600.

The process repeats itself as the object moves along the manufacturing floor. Each jack is undergoing this process simultaneously to maintain the desired load. In some situations, the jack may not have the structural ability to retract far enough to reach a minimum load. Similarly, in some situations, the jack may not have the structural ability to extend far enough to reach minimum load. The system is set up such that maximum load on the system, as a whole, is not reached.

Figure 7:
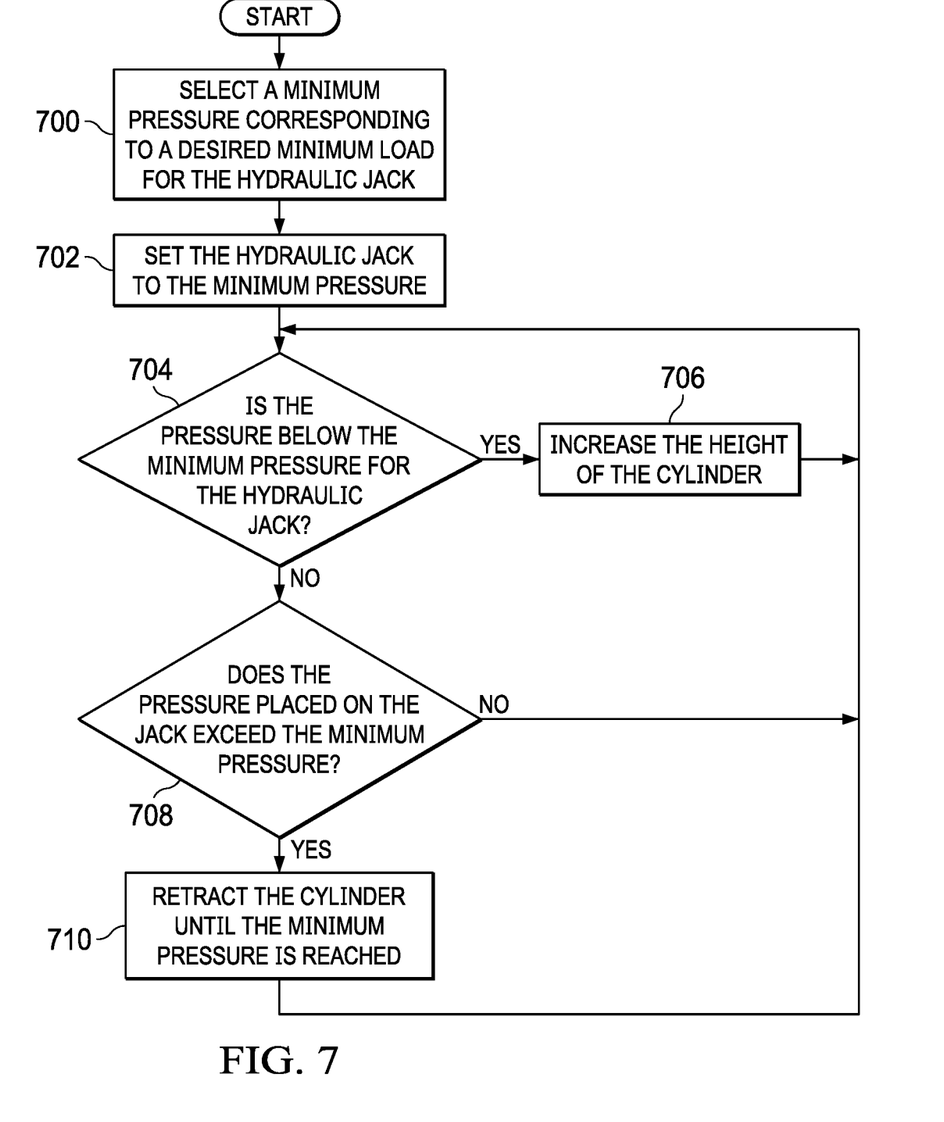
FIG. 7 is an illustration of a flowchart of a process for adjusting the height of a hydraulic jack in accordance with an illustrative embodiment.

In FIG. 7, an illustration of a flowchart of a process for adjusting the height of a jack is depicted in accordance with an illustrative embodiment. The method depicted in FIG. 7 further describes the process in operation 506 in FIG. 5 when a hydraulic jack is used to maintain a minimum load at a tooling point.

The process begins by selecting a minimum pressure corresponding to a desired minimum load for the hydraulic jack (operation 700). Next, the process sets the hydraulic jack to the minimum pressure (operation 702). As the support system moves, the process determines whether the pressure is below the minimum pressure for the hydraulic jack (operation 704). If the pressure is below the minimum pressure selected, the height of the cylinder is increased (operation 706). The process returns to operation 704.

If the pressure is not below than the minimum pressure, the process determines whether the pressure placed on the jack exceeds the minimum pressure (operation 708). If it does not, and the hydraulic jack is at the desired pressure, the process returns to operation 704 to continue monitoring. If the pressure in the hydraulic jack exceeds the minimum pressure, the process then retracts the cylinder until the minimum pressure is reached (operation 710) and returns to operation 704. The process repeats itself as the object moves along the manufacturing floor, with each hydraulic jack adjusting independently.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 8:
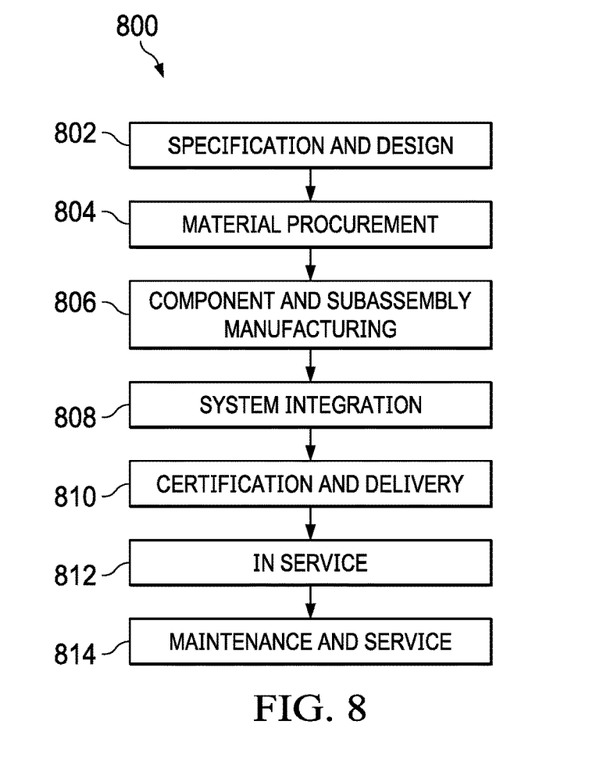
FIG. 8 is an illustration of a block diagram of an aircraft manufacturing and service method in accordance with an illustrative embodiment.
Figure 9:
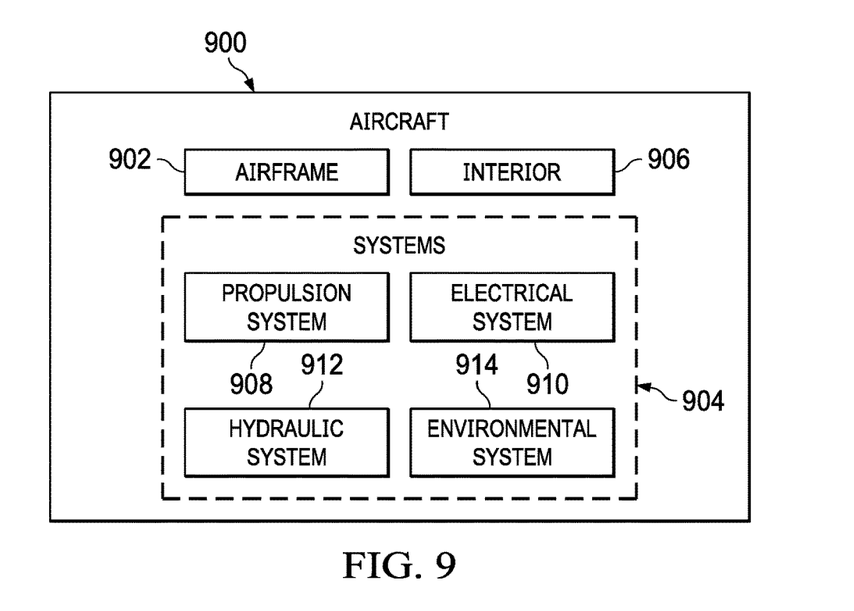
FIG. 9 is an illustration of a block diagram of an aircraft in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of a block diagram of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 to be placed in service 812. While in service 812 by a customer, aircraft 900 in FIG. 9 is scheduled for routine maintenance and service 814, which may include modification, reconfiguration, refurbishment, and other maintenance or service.

Support system 210 from FIG. 2 and the components within support system 210 may be made during component and subassembly manufacturing 806. In addition, support system 210 may be used in parts made for routine maintenance and service 814 as part of a modification, reconfiguration, or refurbishment of aircraft 900 in FIG. 9.

Each of the processes of aircraft manufacturing and service method 800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of a block diagram of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8.

In one illustrative example, components or subassemblies produced in component and subassembly manufacturing 806 in FIG. 8 may be fabricated or manufactured in a manner similar to components or subassemblies produced while aircraft 900 is in service 812 in FIG. 8. As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 is in service 812, during maintenance and service 814 in FIG. 8, or both. The use of a number of the different illustrative embodiments may substantially expedite the assembly of aircraft 900, reduce the cost of aircraft 900, or both expedite the assembly of aircraft 900 and reduce the cost of aircraft 900.

The illustrative embodiments decrease aircraft manufacturing and installation time while preventing damage to rigid, fragile aircraft parts. The system works to maintain a minimum load on each point, thus ensuring that damaging load conditions are substantially reduced or eliminated.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for alleviating a load on an object being moved, the method comprising:
   positioning a support system at a nominal location with respect to the object, wherein the support system comprises:
      jacks, each jack in the jacks comprising, respectively, a cylinder that comprises a hydraulic pressure, and a pressure regulation system configured to regulate the hydraulic pressure in the cylinder; and
      supports, each support in the supports associated with one of the jacks;
   selecting a desired constant pressure for the jack;
   positioning the object on the support system;
   moving the support system with the object across a path; and
   retracting, responsive to the hydraulic pressure exceeding the desired constant pressure, the cylinder via the pressure regulation system bleeding a portion of the hydraulic pressure from the cylinder;
   adjusting, responsive to the hydraulic pressure in the jack differing from the desired constant pressure and independent from a coordination with other jacks, a height of each of the jacks with the support system moving along the path and thereby maintaining a desired load preventing damage to the object.

2. The method of claim 1, further comprising:
   adjusting the height of each of the jacks comprises via extending or retracting the cylinder; and
   the desired load being a load on the object from a platform connecting the cylinder to the object.

3. The method of claim 2, wherein the jacks are hydraulic jacks and adjusting the height of each of the hydraulic jacks comprises:
   adjusting the height of the cylinder in each of the hydraulic jacks and maintaining a minimum load on each of the hydraulic jacks.

4. The method of claim 3, further comprising:
   determining that the hydraulic pressure in the jack is less than the desired constant pressure; and
   extending the height of the cylinder in the jack until the desired constant pressure is reached.

5. The method of claim 3, further comprising:
   determining that the hydraulic pressure in the jack exceeds the desired constant pressure; and
   retracting the height of the cylinder in the jack until the desired constant pressure is reached.

6. The method of claim 4, wherein adjusting the height of each of the hydraulic jacks further comprises:
   selecting the desired constant pressure for the jack corresponding to the minimum load for the jack.

7. The method of claim 6 further comprising:
   increasing the height of the cylinder in the jack when the hydraulic pressure within the jack is below the desired constant pressure for the jack.

8. The method of claim 6 further comprising:
   decreasing the height of the cylinder in the jack when a pressure within the jack is above the desired constant pressure for the jack.

9. The method of claim 6, further comprising the desired constant pressure for each of the hydraulic jacks being set prior to moving the object.

10. The method of claim 3 further comprising:
    maintaining a plane for the object.

11. A load alleviation system configured to prevent damage to an object in transport comprises:
    hydraulic jacks, such that each hydraulic jack of the hydraulic jacks, respectively, comprises a cylinder that comprises a pressure, a desired constant pressure, and a pressure regulation system configured to adjust, responsive to a difference in the pressure in the hydraulic jack from the desired constant pressure and independent from a coordination with other hydraulic jacks, the pressure in the cylinder and a height of the hydraulic jack that maintains the desired constant pressure;
    a bleed in the pressure regulation system configured such that responsive to the pressure being greater than the desired constant pressure the cylinder retracts; and
    supports configured to transport the object along a path, each support in the supports, respectively, being associated with one of the hydraulic jacks.

12. The load alleviation system of claim 11, further comprising:
    the desired constant pressure is predetermined based upon a desired minimum load where a platform connected to cylinder contacts the object; and
    the cylinder in the hydraulic jack is configured to extend when the pressure in the hydraulic jack is less than the desired constant pressure.

13. The load alleviation system of claim 12, wherein the cylinder in the hydraulic jack is configured to retract when the pressure in the hydraulic jack exceeds the desired constant pressure.

14. The load alleviation system of claim 11 further comprising:
    the desired constant pressure, respectively, in each hydraulic jack being set before the object is loaded for transport.

15. The load alleviation system of claim 11, wherein the supports are configured to balance a load from the object between the hydraulic jacks to prevent damage to the object.

16. The load alleviation system of claim 11, wherein each of the supports comprises an autonomous vehicle configured to move about a manufacturing floor.

17. A method for alleviating a load on an aircraft structure being moved, the method comprising:
    selecting a position under the aircraft structure and a desired constant pressure for each hydraulic jack in a support system;

positioning the aircraft structure on the support system, wherein the support system comprises:
- a plurality of tools, each tool in the tools comprising, respectively, a hydraulic jack comprising: a cylinder comprising a hydraulic pressure, a pressure regulation system regulating the hydraulic pressure in the cylinder;
- a support associated with the hydraulic jack; and
- a movement system;

moving the support system with the aircraft structure across a path;

retracting, responsive to the hydraulic pressure exceeding the desired constant pressure, the cylinder via the pressure regulation system bleeding a portion of the hydraulic pressure from the cylinder; and adjusting, responsive to the hydraulic pressure in the hydraulic jack other than the desired constant pressure and independently from a coordination with another jack on another tool, a height of the plurality of tools as the support system moves along the path and thereby maintaining a desired load preventing damage to the aircraft structure.

18. The method of claim 17, wherein maintaining the desired load comprises maintaining a minimum load on the hydraulic jack in the tool.

19. The method of claim 17 further comprising:
- determining that a load placed on the hydraulic jack by the aircraft structure is less than the desired load for the hydraulic jack;
- extending the height of the cylinder in the hydraulic jack until the desired load is reached;
- determining that the load placed on the hydraulic jack by the aircraft structure exceeds the desired load desired for the hydraulic jack; and
- retracting the height of the cylinder in the hydraulic jack until the desired load is reached.

20. The method of claim 19 further comprising:
- selecting the desired constant pressure corresponding to the desired load for the hydraulic jack;
- increasing the height of the cylinder in the hydraulic jack when a pressure within the hydraulic jack is below the desired constant pressure selected; and
- decreasing the height of the cylinder in the hydraulic jack when the pressure within the hydraulic jack is above the desired constant pressure selected.

\* \* \* \* \*